UNITED STATES PATENT OFFICE.

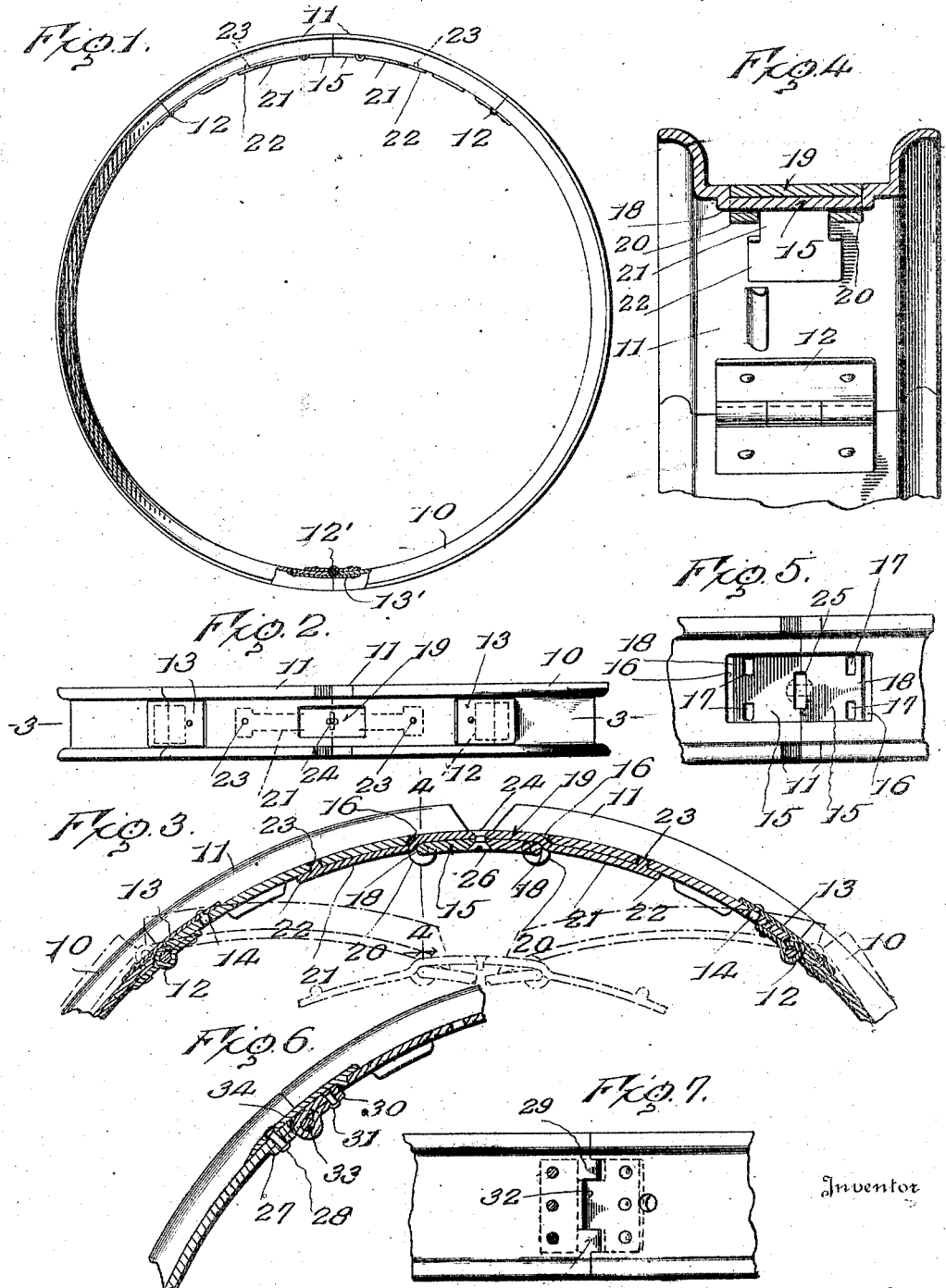

OHMER H. BARTHOLOMEW, OF PEORIA, ILLINOIS.

COLLAPSIBLE WHEEL-RIM.

1,316,758. Specification of Letters Patent. Patented Sept. 23, 1919.

Application filed January 25, 1918. Serial No. 213,763.

*To all whom it may concern:*

Be it known that I, OHMER H. BARTHOLOMEW, a citizen of the United States, residing at Peoria, in the county of Peoria and State of Illinois, have invented certain new and useful Improvements in Collapsible Wheel-Rims, of which the following is a specification.

This invention relates to an improved demountable wheel rim for motor vehicles and has as its primary object to provide a construction whereby the rim may be collapsed so that a tire may be easily placed upon or removed from the rim.

The invention has as a further object to provide a rim embodying coacting hinged rim sections which may be swung inwardly for collapsing the rim and to also provide an improved hinge member for connecting the sections at the meeting ends thereof.

A further object of the invention is to provide a rim wherein the hinge member will be formed with stop arms arranged to project through the rim to engage the inner side thereof for limiting the hinged rim sections in their outward movement to active position.

And the invention has as a still further object to provide a construction wherein the said stop arms will be equipped with studs for engagement with the hinged rim sections to hold the meeting ends thereof against relative transverse movement as well as to rigidly connect the said sections and thus relieve the strain upon the hinge lugs and pivot webs for the hinge member.

Other and incidental objects will appear as the description proceeds, and in the drawings wherein I have illustrated the preferred embodiment of the invention, and wherein similar reference characters designate corresponding parts throughout the several views:

Figure 1 is a side elevation of my improved rim showing the hinged rim sections thereof in normal active position.

Fig. 2 is a plan view particularly showing the body of the hinge member connecting the meeting ends of the hinged rim sections.

Fig. 3 is a sectional view taken on the line 3—3 of Fig. 2, and particularly showing the stop arms of the hinge member for the meeting ends of the rim sections.

Fig. 4 is a transverse sectional view on the line 4—4 of Fig. 3, showing, on an enlarged scale, the manner in which the hinge member is swingingly connected with the rim sections.

Fig. 5 is a plan view with the hinge member removed, this view particularly showing the seat formed in the bottom of the rim at the meeting ends of the rim sections for receiving the body of the hinge member connecting the said sections.

Fig. 6 is a fragmentary sectional view showing a modified form of hinge between the rim sections and the body of the rim, and Fig. 7 is a fragmentary plan view of such modified form of hinge.

Referring more particularly to the drawings it will be noted that my improved rim is of the channel type and includes a split resilient rim body 10 formed of swingingly connected members. Swingingly connected to the free ends of the rim body are coacting rim sections 11. The outer ends of the rim sections are joined to the ends of the rim body by butt hinges 12 and arranged to overlie the joints at the said hinges are lap plates 13 normally seating within the channel of the rim. The outer ends of these plates are secured to the rim body by the adjacent fastening devices holding the hinges 12 while the inner extremities of the said plates are adapted to project within the outer ends of the hinged rim sections for thus presenting a smooth surface to a tire at the joints between the hinged rim sections and the body. Secured to the inner extremities of the said plates are laterally projecting studs 14 adapted for engagement in suitable openings in the inner extremities of the rim sections to provide a rigid connection between the rim body and the said sections. Moreover, the studs will brace the outer ends of the rim sections and the adjacent ends of the rim body against relative transverse movement. A hinge 12' similar to the hinges 12 is employed to connect the members of the rim body and associated with the hinge 12' is a lap plate 13' similar to the plates 13.

At the meeting ends of the hinged rim sections 11, the bottom wall of the rim is, as particularly shown in Fig. 5, pressed out to provide a socket or seat 15 at the ends of which are formed transversely extending slots 16. Adjacent the ends of these slots the rim sections are further provided with openings 17 defining pivot webs 18 between the said openings and the slots. Swingingly connecting the meeting ends of the rim sections is a hinge member including a body or hinge plate 19 normally received within the socket 15 to lie flush with the bottom wall of the rim. This plate is formed at its ends with pairs of hinge lugs 20 bent to project through the extremities of the slots 16 and extending at their free extremities into the openings 17 to consequently embrace the pivot webs 18 for swingingly connecting said plate with the rim sections. Extending from the ends of the plate 19 between the pairs of lugs 20 and projecting through the slots 16 are longitudinally reduced stop arms 21. These stop arms are, as particularly shown in Fig. 3, offset adjacent their inner extremities to lie flat against the inner faces of the hinged rim sections at their inner ends and are formed at their outer extremities with laterally enlarged heads 22. These heads provide an increased bearing area for the said arms at their outer ends and are equipped with outwardly projecting studs 23 adapted for engagement in suitable openings in the bottom walls of the rim sections. It will thus be seen that these studs 23 will coact with the rim sections to provide a rigid connection between the inner ends thereof and consequently relieve the strain upon the hinge lugs 20 of the hinge member as well as the strain upon the hinge webs 18 of the rim sections. At the same time these lugs will also coact with the rim sections for bracing the inner ends thereof against relative transverse movement.

Swiveled upon the plate 19 of the hinge member is a locking key 24 adapted to project through a suitable opening 25 at the meeting ends of the rim sections and provided with an oblong head 26 rotatable to engage beneath the said sections for thus locking the sections against inward movement. The hinged rim sections will thus be held rigidly in active position to complete the contour of the rim and coact with the rim body for supporting a tire. As will now be seen the key 24 may be released when, by pressing inwardly upon the meeting ends of the hinged rim sections, the said sections may be swung inwardly to inactive position for collapsing the rim. Upon the initial movement of the meeting ends of the rim sections, the outer ends of the said sections will, of course, move out of engagement with the studs 14 of the lap plates 13, while the studs 23 of the arms 21 of the hinge member connecting the said sections will move out of engagement with the sections at their inner extremities so that the initial swinging of the sections at their meeting ends will be unhampered. After the hinged rim sections have been swung to inactive position, the members of the rim body may be pivoted inwardly upon each other at the hinge 12' so that a tire may, as will be well understood, be readily removed from the rim. For mounting a tire upon the rim the rim is, of course, first collapsed and the tire initially fitted in position thereon. The members of the rim body are then pivoted outwardly to fit against the tire when the meeting ends of the rim sections are swung outwardly to active position as shown in Figs. 1 and 3 of the drawings, for completing the contour of the rim. In this connection particular attention is directed to the fact that when the inner ends of the rim sections are so swung outwardly the arms 21 will engage the inner faces of the said rim sections at their meeting ends for limiting the said sections in their outward movement. Outward displacement of the meeting ends of the rim sections is thus positively prevented while, as previously explained, the said arms will coöperate with the rim sections for bracing the said sections with respect to each other as well as rigidly connecting the sections at their meeting ends. It will, therefore, be seen that I provide a particularly simple and efficient construction for the purpose set forth and a rim which may be used in connection with substantially any conventional type of motor vehicle wheel.

In Figs. 6 and 7 of the drawings I have illustrated a slight modification which relates more particularly to the hinge construction between the outer ends of the rim sections and the ends of the rim body. In this modification the bottom wall of the rim body is, at its ends, provided with extensions 27 bent beneath the rim body and secured by suitable fastening devices 28. These extensions are cut away to form hinge lugs 29. The bottom walls of the rim sections are, at the outer ends of the said sections, provided with similar extensions 30 bent beneath the rim sections and secured by fastening devices 31. The extensions 30 are cut away to provide hinge lugs 32 mating with the hinge lugs 29 and connected therewith by suitable pivot pins 33. The lap plates which have been indicated at 34 and correspond to the lap plates 13 of the preferred construction, are secured to the ends of the rim body by the fastening devices 28. This provides a simple construction for connecting the rim sections with the rim body and in some instances may be found better adapted than the preferred construction.

Having thus described the invention, what is claimed as new is:

1. A collapsible rim including a split rim body, coacting rim sections swingingly connected with the ends of the rim body, and means hingedly connecting the meeting ends of said rim sections and extending through said sections for engagement with the inner sides thereof to limit the sections in their outward movement to active position completing the annular contour of the rim.

2. A collapsible rim including a split rim body, coacting rim sections swingingly connected with the ends of the rim body, and a hinge member swingingly connecting the meeting ends of said sections, said hinge member including a body, and arms extending from the body and projecting through said sections for engagement with the inner sides thereof to limit the sections in their outward movement to active position completing the annular contour of the rim.

3. A collapsible rim including a split rim body, coacting rim sections swingingly connected with the ends of the rim body, and a hinge member swingingly connecting the meeting ends of the said sections, the said member including a body adapted to overlie the joint between the meeting ends of the rim sections, and arms projecting longitudinally from the ends of the body and extending through the rim sections for engagement with the inner sides thereof to limit the said sections in their movement to outward position to complete the annular contour of the rim.

4. A collapsible rim including a split rim body, rim sections hinged to the ends of the rim body, means swingingly connecting the meeting ends of the rim sections and projecting through the said sections for engagement with the inner sides thereof to limit the sections in their outward movement to active position completing the annular contour of the rim, and means carried by said first mentioned means and adapted for engagement with the rim sections at opposite sides of the joint therebetween to provide a rigid connection between the said sections.

5. A collapsible rim including a split rim body, rim sections hinged to the ends of the rim body, a hinge member swingingly connecting the meeting ends of the rim body and provided with arms projecting through the said sections for engagement with the inner sides thereof to limit the sections in their outward movement to active position completing the annular contour of the rim, and studs carried by the said arms and adapted for engagement with the rim sections at opposite sides of the joint therebetween to provide a rigid connection between the said sections.

6. A collapsible rim including a split rim body, rim sections swingingly connected to the ends of the rim body and formed adjacent their meeting ends with slots, and a hinge member swingingly connecting the meeting ends of the said sections, said hinge member including a body, lugs carried by the body and extending through said slots for hingedly connecting the sections, and arms projecting from the ends of the body through the slots and adapted for engagement with the inner sides of the sections to limit the sections in their outward movement to complete the annular contour of the rim.

7. A collapsible rim including a split rim body, rim sections swingingly connected to the ends of the rim body and formed adjacent their meeting ends with transverse slots, the rim sections being provided with openings adjacent said slots to define hinge webs between the openings and the slots, and a hinge member swingingly connecting the meeting ends of the rim sections, the said hinge member including a body spanning the joint between the meeting ends of the sections, hinge lugs formed from the ends of the body to project through said slots and extend into the said openings and embrace the hinge webs for hingedly connecting the sections, and arms projecting from the ends of the body through the slots for engagement with the inner sides of the sections to limit the sections in their outward movement to active position completing the annular contour of the rim.

8. A collapsible rim including a split rim body, hinged rim sections swingingly connected to the ends of the rim body, a hinge member swingingly connecting the meeting ends of the rim and provided with arms projecting through the rim sections for engagement with the inner sides thereof to limit the said sections in their outward movement to active position completing the annular contour of the rim, and a locking key carried by the hinge member and adapted for engagement beneath the rim sections at their meeting ends for locking the said sections against inward movement.

9. A collapsible rim including a split rim body, hinged rim sections swingingly connected to the ends of the rim body, lap plates mounted to overlie the joints between the body and the rim sections, studs carried by said plates and adapted for engagement with the rim sections to provide a rigid connection between the said sections and the rim body, and a hinge member swingingly connecting the meeting ends of the rim sections and provided with means adapted for engagement with the inner sides of said sections to limit the sections in their outward movement to active position completing the annular contour of the rim.

10. A collapsible rim including a split rim body, coacting rim sections swingingly connected with the ends of the rim body, and means hingedly connecting the meeting ends of said rim sections and provided with elements adapted to coact with the sections at the inner sides thereof for limiting the sections in their outward movement to active position completing the annular contour of the rim.

In testimony whereof I affix my signature.

OHMER H. BARTHOLOMEW. [L. S.]